July 3, 1962
G. M. GUY
3,042,430
FAST ACTION COUPLING AND CLAMPING ASSEMBLY
Filed Aug. 25, 1958
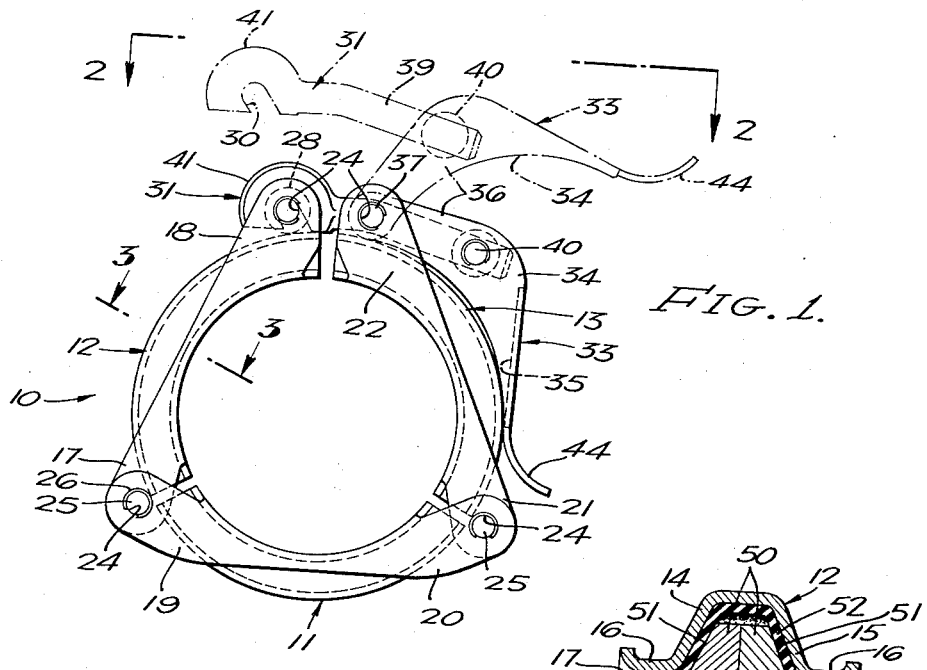
FIG. 1.
FIG. 3.
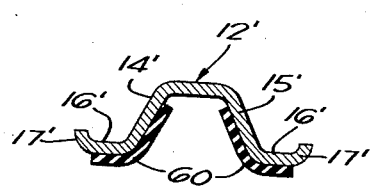
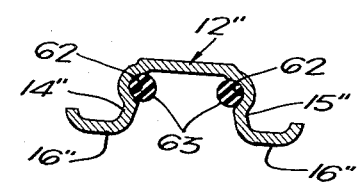
FIG. 2.
FIG. 4.
FIG. 5.
INVENTOR.
GRANVILLE M. GUY
BY
ATTORNEYS

United States Patent Office 3,042,430
Patented July 3, 1962

3,042,430
FAST ACTION COUPLING AND CLAMPING ASSEMBLY
Granville M. Guy, Los Angeles, Calif., assignor to Poly Industries, Inc., a corporation of California
Filed Aug. 25, 1958, Ser. No. 756,802
4 Claims. (Cl. 285—365)

This invention relates to a combination coupling and clamping device and more particularly to an improved construction of this type having a toggle latch mechanism and a band of articulated sectors so arranged that the device can be quickly assembled and disassembled about a coupling. It is particularly suitable for use in applications in which disassembly of the parts is a necessity, and particularly applications of this character wherein the working space is limited.

There are numerous applications for clamps and coupling devices where frequent disassembly and reassembly is experienced, one example being in food processing machinery where certain of the components must be removed frequently to permit thorough cleaning to maintain sanitary conditions. The close proximity of other components has made such removal and reassembly of prior coupling devices a laborious and time-consuming operation. Prior couplings provided to meet the needs of such service have been subject to certain disadvantages and shortcomings obviated by the present invention.

The clamp of this invention features a plurality of sectors formed from stamped sheet metal so designed as to be pivotally interconnected at adjacent ends and adapted to be detachably held tightly assembled about the flanged ends of conduit sections by a simple but highly effective toggle latch mechanism. In released position, the toggle latch disengages from one of the split ends of the clamp thereby allowing the several sectors to pivot away from one another and from the conduit being coupled together. Another feature of the design is the reinforcement of the sector side walls by the provision of outturned tabs from the rim edges of the sectors and the nesting of these tabs at their adjacent ends to receive coupling pins. Another feature is the provision of a stamped metal toggle lever having its opposite side walls journaled to the tabs at one split end of the coupling and supporting between its side walls a hook bolt type latch notched at its outer end to fit over trunnion means supported between the tabs of the other split end of the clamp. Accordingly, it will be appreciated that the toggle mechanism is fully confined between the tabs provided along the opposite sides of the clamping band proper with the result that the clamp can be assembled within extremely close quarters axially of the conduit sections being clamped.

Accordingly, it is a primary object of the present invention to provide an improved combination clamping and coupling assembly for use in detachably securing together the flanged ends of conduit sections.

Another object of the invention is the provision of a combination coupling and clamping device composed of articulated sections and a fast opening toggle latch mechanism all pivotally secured together and wherein the latch means is disengageable with one end of the clamp to facilitate rapid assembly and disassembly with respect to a coupling, as well as one in which all components remain structurally connected.

Another object of the invention is the provision of an improved toggle latch mechanism which is readily adjustable to accommodate variations in manufacturing tolerances and one end of which is quickly detachable from the parts being locked together.

These and other more specific objects will appear upon reading the following specification and claims and upon considering in connection therewith the attached drawing to which they relate.

Referring now to the drawing in which preferred embodiments of the invention are illustrated:

FIGURE 1 is a side elevational view of a coupling and clamping assembly incorporating the present invention, illustrating the position of parts in closed, locked engagement;

FIGURE 2 is a top plan view of FIGURE 1 as is indicated by line 2—2 on FIGURE 1;

FIGURE 3 is a transverse sectional view through the assembly and through the flanged ends of conduit sections held in assembled relation thereby, the section through the clamp per se being taken along line 3—3 on FIGURE 1;

FIGURE 4 is a transverse sectional view through another preferred embodiment showing a different type of resilient gasket; and FIGURE 5 is a cross-sectional view through a sector of a further embodiment showing still a different type of resilient gasket.

Referring first to FIGURE 1, there is shown a combined coupling and clamping assembly designated generally 10 formed from three generally similar arcuate shaped sectors 11, 12 and 13. As is best illustrated in FIGURE 3, each sector has diverging side walls 14 and 15 and wide lips 16 turned outwardly at their rim edges to provide tabs parallel to one another along the opposite lateral edges of the sectors. The tabs at the opposite ends of the sector 12 are designated 17 and 18, respectively, whereas the corresponding tabs of sector 11 are designated 19 and 20, respectively. As will be best understood from FIGURE 2, tabs 19 and 20 are spaced sufficiently from one another to overlap and straddle the adjacent tabs of sectors 11 and 13. The overlapping ends of the several tabs are provided with aligned openings 24 seating the ends of pivot pins 25, the latter being held in assembled position in any suitable manner, as by means of split spring keepers 26 seated in grooves immediately beside the exterior faces of the tabs.

The pairs of tabs 18, 18 and 22, 22 on the ends of sectors 12 and 13 are so formed as not to overlap one another but to terminate in slightly spaced relation circumferentially of the assembly, as is clearly indicated in FIGURES 1 and 2. Seated within the aligned openings 24 of tabs 18 are the ends of a trunnion pin 28 held in assembled position as by split spring keeper 26. Preferably the mid-portion 29 of the trunnion is of reduced diameter so as to be receivable within notch 30 of hook bolt 31, the details of which will be more fully described presently.

The means for holding the coupling assembly detachably locked in assembled position comprises a toggle latch mechanism designated generally 33, the operating lever 34 of which is preferably formed from sheet metal and has a generally L-shaped configuration as is best illustrated in the dot-and-dash line open position showing thereof in FIGURE 1. One leg of lever 34 is of channel shape in cross-section and includes a web portion 35 and parallel side walls 36, 36 (FIGURE 2), the extended ends of which cooperate to form the second leg of the L-shaped lever 34. Preferably the web portion 35 is cut away between the side walls constituting the last-mentioned leg of the lever in order that hook bolt 31 may pivot freely into and out of position between side walls 36. The outer free ends of side walls 36 remote from web 35 are provided with aligned openings to receive short rivets 37 serving to hold toggle mechanism 33 pivotally assembled in aligned openings 24 of tabs 22. Rivets 37 may be peened over or retained detachably in assembled position by split spring keeper 26.

Hook bolt 31 has a threaded shank 39 adjustably seated in a transverse threaded bore through the midportion of a trunnion 40 the opposite ends of which are journaled in side walls 36 of lever 33 near the junction of its legs. The outer end of the hook bolt preferably is enlarged to provide a head 41 having flattened opposite side faces 42, 42. It will be observed from FIGURE 1 that the latch notch 30 opens laterally through the one longitudinal edge of the head and that its inner or closed end is more remote from supporting trunnion 40 than is the open end thereof. It will therefore be evident that as the toggle lever is pivoted outwardly toward the open position indicated in dot-and-dash lines in FIGURE 1, hook bolt 31 is automatically cammed out of engagement with the reduced diameter midportion of trunnion 28 and is freely pivotable outwardly to the disconnected position shown. Likewise upon pivoting toggle lever toward the closed position shown in full lines in FIGURE 1, hook bolt notch 30 may be re-engaged with the midportion of trunnion 28 after which further downward pivotal movement of the toggle lever acts to draw the sectors 11, 12 and 13 into tighter powerful clamping relation with respect to the coupling means being clamped. As the web 35 of the toggle lever pivots into contact with the exterior of sector 13, a straight line drawn between the axes of trunnions 28 and 40 will lie slightly inside the axis of rivets 37, 37. When the toggle latch mechanism is in this position the latch is positively locked in closed position. Breaking of the lock is accomplished simply by pulling finger tab 44 at the outer end of operating lever 34 away from sector 13 until the described straight line between the axes of trunnions 28 and 40 passes outwardly beyond the axis of rivets 37. Further outward pivotal movement of the latch mechanism automatically disconnects the hook bolt from trunnion 28 allowing sectors 12 and 13 to pivot away from one another about the opposite ends of sector 11. The coupling device may now be freely withdrawn from about the pipe sections.

Referring now to FIGURE 3, there is shown a suitable type of flanged joint adapted to be detachably coupled together by the described coupling assembly. Secured to the adjacent ends of conduits 44 and 45, as by welding 46, are flanged rings 47 and 48. Ring 47 is preferably provided with an annular groove seating an O-ring 49 adapted to engage the radial face of ring 48 in the clamped position of the coupling. Rings 47 and 48 have annular flanges 50, 50, the facing ends of which are preferably radial and adapted to abut one another, whereas the remote outer faces 51, 51 converge toward one another similarly to the angle of divergence of side walls 14 and 15 of the clamping assembly. Although not essential, preferably there is interposed between the inclined surfaces of the flanges and the juxtaposed side walls of the clamp a suitable resilient gasket 52. Desirably this gasket is bonded to the interior walls of the clamp sectors.

From the foregoing description of the coupling assembly and of the conduit flanges adapted to be clamped together, it will be appreciated that the assembly is highly effective in forcing the radial faces of the pipe flanges 50, 50 into firm contact and sealing engagement with any suitable supplemental sealing means such as O-ring 49. Not only does the coupling assembly perform this function, but it also acts to supplement other structural features of the coupling in holding the pipes in axial alignment.

Referring to the modified embodiment of the coupling assembly shown in FIGURE 4, it will be understood that the individual sectors of the articulated clamp are generally similar to those described above in connection with FIGURES 1 to 3, it being noted that the depth of the groove between the side walls 14′, 15′ is somewhat less than that illustrated in the first embodiment. Furthermore, the sealing gasket is formed in two strips 60, 60 suitably bonded to the opposite inclined walls of the sectors. The omission of the gasket in the web portion between walls 14′, 15′ provides additional room for contraction of the coupling assembly without contact with the outer peripheral edges of the conduit flanges 50, 50 and without any sacrifice in the effectiveness of the gasket.

In still another modified embodiment of the coupling and clamping assembly shown in FIGURE 5, the opposite diverging side walls 14″, 15″ of the clamping sectors are formed with shallow grooves 62, 62 opening toward one another and having fixed therewithin generally circular resilient gaskets 63. It will be understood that in other respects the coupling assembly is similar to that previously described and that the assembly shown in FIGURES 4 and 5 include the various other features described above in connection with FIGURES 1 to 3.

While the particular combined coupling and clamping assembly herein shown and disclosed in detail is fully capable of attaining the objects and providing the advantages hereinbefore stated, it is to be understood that it is merely illustrative of the presently preferred embodiments of the invention and that no limitations are intended to the details of contruction or design herein shown other than as defined in the appended claims.

I claim:

1. In a combination split band coupling and clamping assembly of the quick breakaway type adapted to clamp adjacent radially flanged conduit ends sealed together under high axial pressure, that improvement which comprises a plurality of generally similar arcuate clamp sectors of V-shape in cross-section pivotally connected at their adjacent ends and cooperating to form a split band encircling and embracing the converging surfaces of radially flanged ends of conduit sections substantially throughout the full circumference of the flanged ends of the conduit sections in a manner to pull said flanges together under high axial pressure in end-to-end abutment as said assembly is tightened, each of said sectors having tabs at its opposite ends turned radially backwardly from the opposite rim edges thereof, pivot pin means interconnecting said tabs at adjacent ends of said sectors, toggle latch means for releasably drawing said sectors into tight coupling relation about conduit flanges, said toggle latch means including a generally L-shaped lever having one end pivotally supported in a pair of tabs at one end of said split band, hook bolt means having one end journaled between the lateral edges of said L-shaped lever at a point adjacent the junction of the legs thereof, the other end of said hook bolt having a transverse slot opening through the inwardly facing edge thereof at an angle to the length of said bolt and with its open end closer to the lever pivot than its closed end, trunnion means supported between the tabs at the other free end of said split band, the midportion of said trunnion being adapted to fit loosely into said hook bolt slot when said lever is pivoted to its open position outwardly away from said band and being cooperable therewith to tighten said clamp as the outer free end of said L-shaped lever is pivoted to its closed position with the legs thereof lying closely beside the arcuate exterior side of said coupling assembly.

2. A breakaway band clamp and coupling device adapted to have its opposite ends held embracing and closed about the converging surfaces of a radially flanged annular joint by a readily disconnectible toggle mechanism, said device comprising a plurality of generally similar articulated sectors formed from sheet metal of arcuate shape and cooperable to contact substantially the entire circumference of said joint, said sectors each being provided with diverging opposite side walls, the inner rim edges of said side walls being outturned to form radially disposed parallel tabs at the opposite ends of each sector, pin means pivotally connecting the overlapping portions of said tabs adjacent said sector ends, and toggle latch means including an operating lever pivotally supported between the tabs at one end of said device, said toggle latch means pivotally supporting a hook bolt having an inwardly facing notch at its outer end, and pin means supported between the tabs at the other end of said clamp device and having its midportion shaped to be engaged with the notched end of said hook bolt.

3. A device as defined in claim 2 characterized in that said operating lever comprises a generally L-shaped member having one leg forming a handle of channel shape in cross-section, the side walls of said channel-shaped handle being extended parallel to one another to form the other leg of said L-shaped operating lever, and means pivotally connecting the inner end of said hook bolt to said L-shaped operating lever adjacent the junction of the two legs thereof.

4. A device as defined in claim 2 characterized in that said operating lever comprises spaced-apart parallel side walls of L-shape interconnected along one leg of said lever by a web integral with said side walls, a trunnion member journalled between said side walls intermediate the opposite ends thereof, and the inner end of said hook bolt being adjustably connected to the mid-portion of said trunnion member and positioned between the side walls of said operating lever.

References Cited in the file of this patent

UNITED STATES PATENTS

| | | |
|---|---|---|
| 2,390,232 | Venditty | Dec. 4, 1945 |
| 2,507,261 | Mercier | May 9, 1950 |
| 2,601,172 | Sebok | June 17, 1952 |
| 2,706,648 | Gosse | Apr. 19, 1955 |
| 2,842,385 | Webster | July 8, 1958 |
| 2,846,244 | Parker | Aug. 5, 1958 |

FOREIGN PATENTS

| | | |
|---|---|---|
| 999,422 | France | Jan. 31, 1952 |
| 736,879 | Great Britain | Sept. 14, 1955 |
| 738,141 | Great Britain | Oct. 5, 1955 |
| 776,381 | Great Britain | June 5, 1957 |